(12) United States Patent
Awal et al.

(10) Patent No.: US 11,984,815 B2
(45) Date of Patent: May 14, 2024

(54) MODULAR ISOLATED POWER ELECTRONICS CONVERTER FOR HVAC/MVAC TO LVDC POWER CONVERSION

(71) Applicant: North Carolina State University, Raleigh, NC (US)

(72) Inventors: M A Awal, Raleigh, NC (US); Srdjan Lukic, Raleigh, NC (US); Iqbal Husain, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 17/825,211

(22) Filed: May 26, 2022

(65) Prior Publication Data

US 2022/0416684 A1 Dec. 29, 2022

Related U.S. Application Data

(60) Provisional application No. 63/193,765, filed on May 27, 2021.

(51) Int. Cl.
*H02M 7/217* (2006.01)
*H02M 1/00* (2006.01)
(Continued)

(52) U.S. Cl.
CPC ....... *H02M 7/2173* (2013.01); *H02M 1/0012* (2021.05); *H02M 1/0067* (2021.05);
(Continued)

(58) Field of Classification Search
CPC ............. H02M 1/0012; H02M 1/0067; H02M 1/0074; H02M 1/045; H02M 1/007;
(Continued)

(56) References Cited

U.S. PATENT DOCUMENTS 9,887,616 B2 * 2/2018 Bai ...................... H02M 7/219
11,463,016 B2 * 10/2022 Ying ................... H02M 7/4835
(Continued)

OTHER PUBLICATIONS

Tiefu Zhao; Gangyao Wang; Subharshish Bhattacharya; Alex Q. Huang; "Voltage and Power Balance Control for a Cascaded H-Bridge Converter-Based Solid-State Transformer"; Sep. 3, 2012; IEEE; IEEE Transactions on Power Electronics ( vol. 28, Issue: 4, Apr. 2013) (Year: 2012).*

*Primary Examiner* — Thienvu V Tran
*Assistant Examiner* — Shahzeb K Ahmad
(74) *Attorney, Agent, or Firm* — Thomas | Horstemeyer, LLP

(57) ABSTRACT

Disclosed herein is a modular, scalable, and galvanically isolated power electronics converter topology for medium voltage AC (MVAC) to DC or high voltage AC (HVAC) to DC power conversion. A disclosed modular converter can comprise a low-voltage direct current bus and a centralized controller configured to regulate the low-voltage direct current bus. The modular converter can further comprise a plurality of three-phase blocks connected in series. Individual three-phase blocks of the plurality of three-phase blocks can comprise a plurality of single-phase modules connected in an input-series output-parallel configuration. The modular converter can further comprise a filter connected between a grid input and the plurality of three-phase blocks and a pulse-width modulator configured to generate encoded gate pulses for the individual three-phase blocks of the plurality of three-phase blocks.

17 Claims, 17 Drawing Sheets

(51) Int. Cl.
*H02M 1/04* (2006.01)
*H02M 1/12* (2006.01)
*H02M 1/36* (2007.01)
*H02M 3/335* (2006.01)
*H02M 7/219* (2006.01)
*H02M 7/797* (2006.01)

(52) U.S. Cl.
CPC ......... *H02M 1/007* (2021.05); *H02M 1/0074* (2021.05); *H02M 1/045* (2013.01); *H02M 1/12* (2013.01); *H02M 1/36* (2013.01); *H02M 3/33573* (2021.05); *H02M 3/33584* (2013.01); *H02M 7/219* (2013.01); *H02M 7/797* (2013.01)

(58) Field of Classification Search
CPC ............ H02M 1/12; H02M 1/36; H02M 1/42; H02M 1/4208; H02M 1/4233; H02M 1/4241; H02M 3/335; H02M 3/33573; H02M 3/33584; H02M 7/17; H02M 7/217; H02M 7/23; H02M 7/81; H02M 7/155; H02M 7/162; H02M 7/1623; H02M 7/66; H02M 7/757; H02M 7/7575; H02M 7/2173; H02M 7/219; H02M 7/797

See application file for complete search history.

(56) References Cited

U.S. PATENT DOCUMENTS

| | | | |
|---|---|---|---|
| 2016/0126858 A1* | 5/2016 | Wu | H02M 1/126 363/89 |
| 2016/0152151 A1* | 6/2016 | Yang | B60L 58/27 320/109 |
| 2018/0351368 A1* | 12/2018 | Sun | H02M 3/33584 |
| 2018/0370369 A1* | 12/2018 | Jang | B60L 53/20 |
| 2021/0126541 A1* | 4/2021 | Zhang | H02M 1/0074 |
| 2021/0344283 A1* | 11/2021 | Zhou | H02M 7/53875 |
| 2022/0166343 A1* | 5/2022 | Zhang | H02M 1/325 |

* cited by examiner

MODULAR ISOLATED POWER ELECTRONICS CONVERTER FOR HVAC/MVAC TO LVDC POWER CONVERSION

CROSS-REFERENCE TO RELATED APPLICATIONS

This application claims the benefit of and priority to U.S. Provisional Patent Application No. 63/193,765, entitled "MODULAR ISOLATED POWER ELECTRONICS CONVERTER FOR HVAC/MVAC TO LVDC POWER CONVERSION," and filed on May 27, 2021, which is incorporated by reference herein as if set forth in its entirety.

GOVERNMENT LICENSE RIGHTS

The present invention was made with United States Government support under Grant No. DE-EE0008450 awarded by the U.S. Dept. of Energy—Energy Efficiency & Renewable Energy (DOE/EERE). The United States Government has certain rights in the invention.

BACKGROUND

Extreme fast charging (XFC) is an enabling technology that can reduce range anxiety associated with electric vehicles. Commercial and near commercial single port DC ultra-fast chargers with power capacities up to 350 kW have been reported that connect to 380V-480V AC input, typically generated from a medium voltage AC (MVAC) distribution feeder using a dedicated line-frequency service transformer. Installation of such high-power charging systems requires substantial electrical and infrastructural service upgrades such as upgrades to service transformers, ground surface condition, electrical wiring and conduits, permits, and administration. Consequently, constructing charging stations with multiple charging ports, such as Tesla supercharger station in Mountainview, California, rather than single ports makes more economic sense since the site construction overheads can be distributed over multiple ports.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
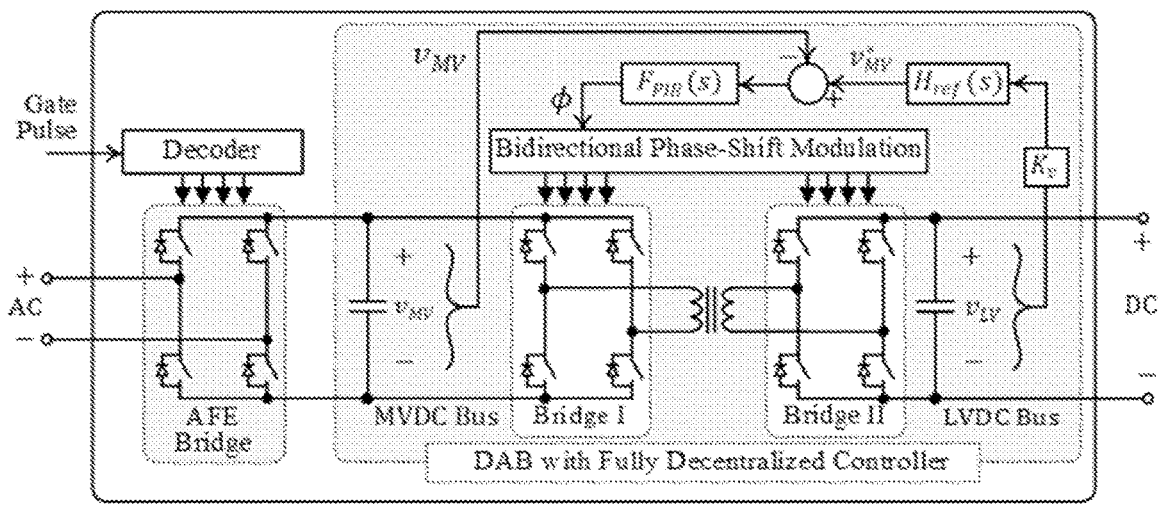
FIG. 1A shows an example of an implementation of a single-phase module with decentralized medium-voltage DC bus voltage regulation, according to various embodiments of the present disclosure.

Disclosed herein is a modular, scalable, and galvanically isolated power electronics converter topology for medium voltage AC (MVAC) to DC or high voltage AC (HVAC) to DC power conversion. The disclosed converter can be connected to an HVAC/MVAC source/grid to supply LVDC power for extreme fast charging of electric vehicles or can be used to connect a battery storage system to MVAC/HVAC grid. For instance, the modular converter can be used in an extreme fast charging station for electric vehicles or energy storage application for grid-support. The disclosed converter can likewise be connected to a MVAC/HVAC grid to deliver power to a DC distribution bus. A start-up sequence is also disclosed that can ensure safe start of operation of the disclosed converter.

The capability to connect directly to MVAC input, such as 4.2 kV or 13.2 kV can be achieved using a power electronics based solid-state-transformer (SST). Historically, SSTs were proposed to replace line-frequency transformers for AC-to-AC conversion and are typically realized using a three-stage topology, i.e., an AC-DC stage, an isolated DC-DC stage, and a DC-AC stage. Such a three-stage configuration facilitates DC connectivity enabling direct integration of battery energy storage systems (BESS) and/or PV resources.

A modular SST configuration, excluding the DC-AC stage, can be utilized for construction of XFC stations to avail direct connectivity to MVAC feeders. The input AC voltage for each single-phase module (SPM) is limited by the adopted power semiconductor device technology; series connection of N SPMs can be used in each phase to reach the desired input voltage. The outputs of the isolated DC-DC stages are tied in parallel to reach the desired power capacity. Such a configuration offers modular and uniform construction of the power stage.

However, scalability in terms of input voltage and overall charging capacity needs control and co-ordination among an increasing number of modules. Uniform power sharing among SPMs and equalizing/balancing the internal medium voltage DC (MVDC) buses during operation are the key challenges. In existing control approaches reported in literature, the 3N internal medium voltage DC (MVDC) buses are maintained by dynamically regulating the input AC current, whereas the low voltage DC (LVDC) bus is maintained by regulating the power flow through the 3N isolated DC-DC stages. Although intuitive, this approach presents two key challenges. First, for balanced three-phase operation one controllable input, such as the grid current, is used to regulate 3N MVDC buses. Second, 3N controllable inputs, such as the power flow through the DC-DC stages, are used to regulate a single output variable, i.e., the LVDC bus voltage. Consequently, voltage balancing among the internal MVDC buses and power flow balancing among the DC-DC stages become important.

The disclosed converter can use three-phase blocks, each comprising a number of single-phase modules (SPMs). This can enable bidirectional power transfers between a three-phase AC bus and a DC bus. Each of the SPMs can comprise an active-front-end (AFE) stage and an isolated DC-DC stage, i.e. a dual active bridge (DAB) stage. The AFE bridge and the DAB stage can share an MVDC bus. Each of the SPMs can be connected in an input-series-output-parallel (ISOP) configuration to reach desired voltage and power capacity. The AFE stages of multiple single-phase modules can be cascaded in series to reach arbitrarily large AC voltage, and the DAB stages can be connected in parallel to reach higher power.

The disclosed control method ensures natural balancing/equalization of MVDC bus voltages without the need for communication using fully decentralized control based on measurements local to the single-phase module itself. The disclosed control method can likewise ensure equal power flow through the DAB stages. The DAB stage can regulate the MVDC bus in a decentralized way based on local measurements, which can include feedback from within the module.

The DC bus voltage regulation or power flow control between the converter and the grid/the three phase AC bus can achieved through a central controller that controls AFE stages. The AFE stages can be controlled by a central controller to regulate the LVDC bus. The centralized controller can control the AFE stages with the LVDC bus feedback and minimal communication.

The power flow through each SPM can have an AC variation around an average value at a frequency twice the AC source/grid frequency. The AC power output of the SPMs can combine at the LVDC side in a three-phase block to give constant/DC power.

The disclosed control method can maintain a fixed voltage conversion ratio for the DAB stage during nominal operation and transients, which can enable efficiency maximization of the DAB stage. The disclosed topology and control structure can eliminate the need for MVDC bus balancing among various modules and power balancing among DAB stages. The MVDC bus can use minimal energy storage elements such as capacitors.

In conventional solutions, a centralized controller with very high bandwidth communication is often needed. These conventional solutions employ complex balancing algorithms leveraging high-speed bidirectional communication among different modules (often as many as 18 to 24) and the centralized controller. All MVDC bus voltages are sent to this central controller. A closed loop compensator is run on the average MVDC voltage to generate grid current reference for the current control loop. Two analog signals—output of the current control loop, i.e., time varying modulation signal, and the average MVDC bus voltage—are sent to each single-phase module. The single-phase modules correct the modulation signal with a compensation term based on the difference between the average MVDC bus voltage and its own MVDC bus voltage. The central controller generates a global power flow reference for all DAB stages and the analog value is sent to all DAB stages over high bandwidth communication channels. The DAB stages are controlled to track the respective power reference sent by the central controller.

Thus, these conventional solutions utilize bidirectional analog information exchange between AFE stages and the central controller. Analog information exchange over high bandwidth communication channel is also needed between the central controller and the DAB stages. Such high-speed communication (on the scale of micro-seconds) is needed to ensure module-level voltage and power balancing and equalizing among all modules. This dependence on high-speed communication for real-time control severely limits the scalability and practical realization of higher voltage and higher power systems. Evidently, there is a clear need for simplified control architecture with reduced communication requirements.

In contrast, in the disclosed converter configuration and control method, DAB stages can be controlled in a decentralized way. The disclosed controller can enable voltage and power balancing using decentralized control of the DC-DC stages based on local sensor feedback. The AFE stages can be controlled by a centralized controller using minimal communication and only the LVDC bus feedback. For example, one-way digital gate pulses can be sent to the AFE stages. Thus, the disclosed solution can provide a modular converter architecture with a minimal or reduced communication requirement.

Moreover, in conventional solutions, MVDC bus voltages are subject to a double-line-frequency pulsation due to the AC and DC power flow through the AFE and the DC-DC stages of the SPMs, respectively. Large capacitors are used on the MVDC bus as energy buffers to suppress such voltage pulsations and reduce the second harmonic oscillation in the MVDC bus voltage. Yet large capacitors rated for MV operation adds significant cost. Large capacitors at medium/high voltage level are very large in size and expensive. Furthermore, relevant safety standards mandate fast discharge/bleeding of stored energy under fault condition and/or for maintenance. Consequently, large energy storage capacitors on the internal MVDC buses complicates system level design.

The disclosed solution, on the other hand, eliminates the second harmonic voltage variation and does not require large capacitors. The reduced capacitor need on the MVDC bus is achieved through design and control. The DC-DC stages are designed and operated to process power pulsating at the double-line frequency and hence, the energy storage needed on the MVDC bus can also be reduced or minimized. The disclosed converter and control architecture can achieve voltage and power balanced operation without dedicated balancing controllers.

Thus, the disclosed converter and corresponding control method can include a modular design and easy manufacturing process, converter operation with voltage, and power balancing among all modules using reduced or minimal communication while augmenting efficiency.

Converter Architecture

FIG. 1A shows an example of an implementation of SPM with decentralized MVDC bus voltage regulation. Galvanically isolated SPMs can be used in the disclosed converter architecture. In this example, the SPM uses an AFE stage and an isolated DC-DC stage, i.e., a dual active bridge (DAB) converter. The SPM here includes two electrical ports—an AC port and a DC port. The AC terminals of an AFE bridge are denoted as the AC port. The DAB stage can give the DC port of the SPM. Both the AFE stage and the DAB stage can be fully bidirectional.

In some examples, a three-level neutral-point diode clamped (NPC) full-bridge topology and a full H-bridge topology can be used on the MVDC and LVDC sides of the DAB converter, respectively. Another NPC full bridge can be used as the AFE stage. The AFE bridge can share an MVDC bus with a DAB stage comprising two full bridges.

In other examples, though, full H-bridge topology can be used for both the MV-side bridge of the DAB and the AFE stage. The DAB stage can be designed and controlled as a DC transformer using fully decentralized control. Thus, no communication with other modules or a centralized controller is needed. The AFE stage can be operated based on encoded gate pulses received via optical fibers. For example, a decoder can receive gate pulses from a central controller and can control power semiconductor devices of the AFE bridge.

Figure 1B:
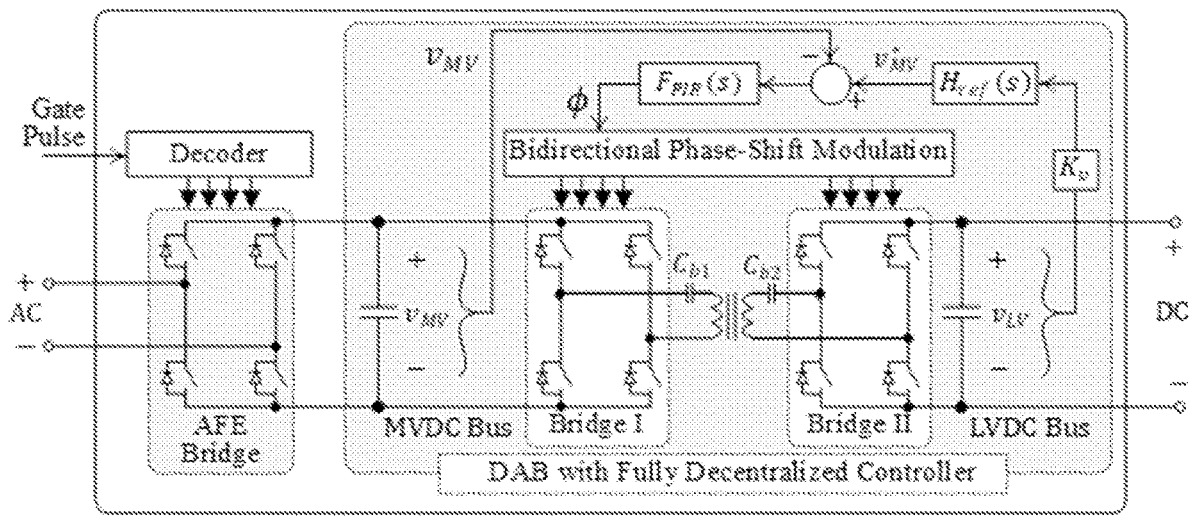
FIG. 1B shows an example of an implementation of a single-phase module with DC blocking caps, according to various embodiments of the present disclosure.

FIG. 1B shows an example of an implementation of an SPM with DC blocking caps. In this example, DC blocking capacitors $C_{b1}$ and $C_{b2}$ can be used to prevent magnetic saturation of the medium frequency transformer (MFT) and likewise prevent DC offsets of the voltage applied across the transformer terminals.

Figure 2:
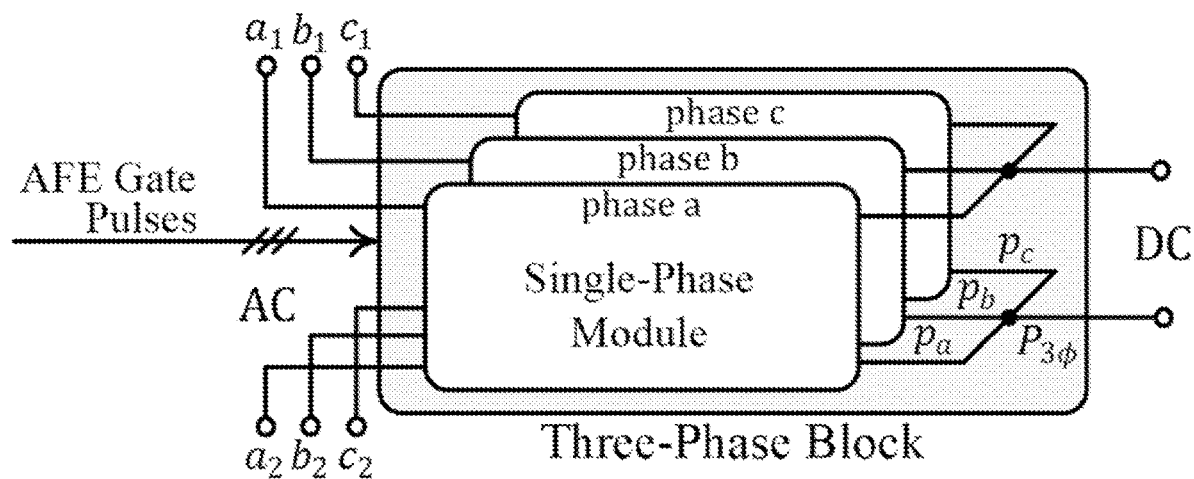
FIG. 2 shows an example of a three-phase block comprising three single-phase modules with constant DC power output, according to various embodiments of the present disclosure.

FIG. 2 shows an example of a three-phase block comprising three SPMs with a constant DC power output. Sufficient voltage control bandwidth and the resonant compensation can ensure that the time-varying power (single-phase AC power varying at second harmonic) can be extracted from the MVDC bus instantaneously and transferred to the LVDC bus. This control strategy can enable maintenance of a constant MVDC bus voltage without second harmonic oscillation even using very small capacitor on the MVDC bus. The varying single-phase powers $p_a(t)$, $p_b(t)$, $p_c(t)$ can combine at the LVDC output of a three-phase block to give constant/DC power as:

$$P_{3\phi} = p_a(t) + p_b(t) + p_c(t) \quad (1)$$

Figure 3A:
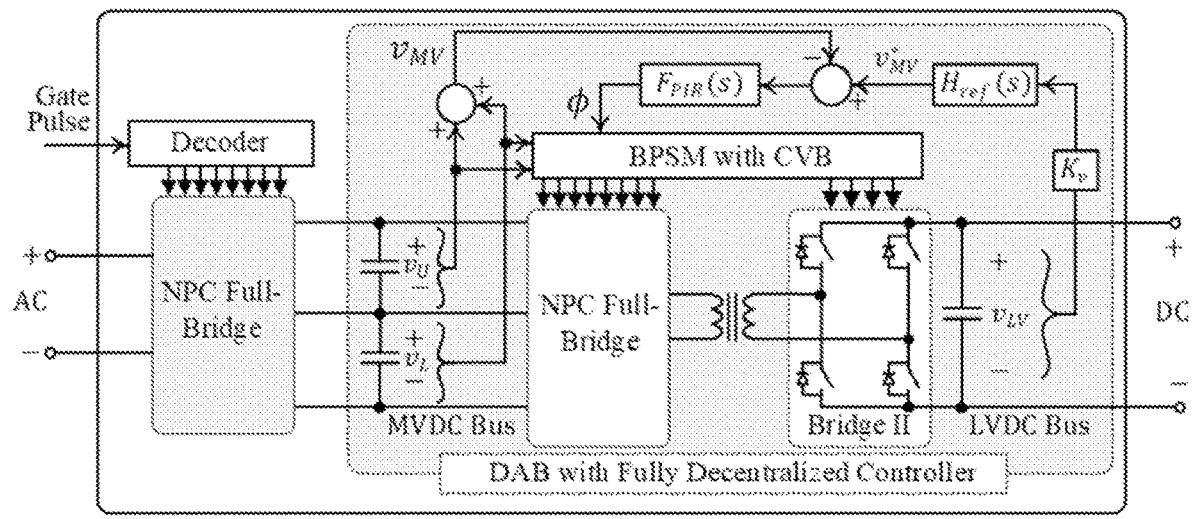
FIG. 3A shows an example of an implementation of a single-phase module using a neutral-point-diode clamped topology, according to various embodiments of the present disclosure.
Figure 3B:
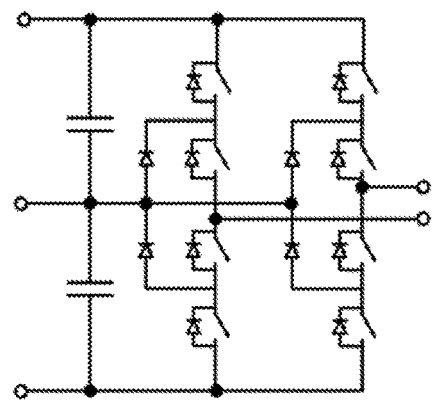
FIG. 3B shows an example of a neutral-point-diode full-bridge, according to various embodiments of the present disclosure.

FIG. 3A shows an example of an SPM implementation using a neutral-point-diode clamped topology for the AFE bridge and Bridge II. The NPC topology, however, can be used for any of the three bridges, including the AFE bridge, Bridge I, Bridge II, or any other suitable bridge. For the NPC topology, capacitor voltage balancing (CVB) can be used. FIG. 3B shows an example of an NPC full bridge.

Figure 4:
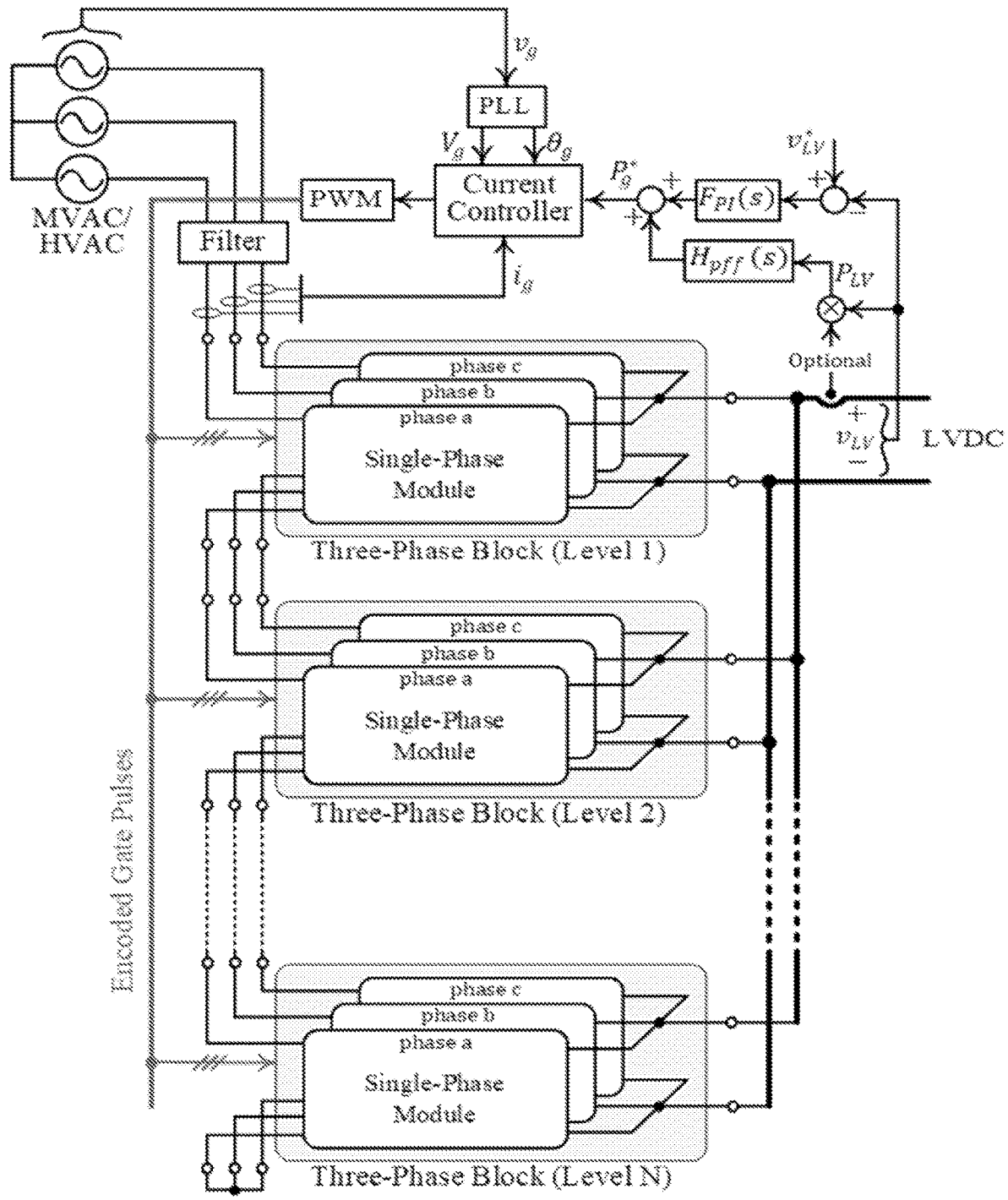
FIG. 4 shows an example of an implementation of a modular converter structure with a central controller for low-voltage DC bus regulation, according to various embodiments of the present disclosure.

FIG. 4 shows an example of an implementation of a modular converter structure with a central controller for low-voltage DC bus regulation. Multiple three-phase blocks can be connected in series on the AC side to reach MVAC/HVAC. A differential mode (DM) filter can be used on the grid side. A common mode (CM) filter can be used on the grid side or on the LVDC side. The LVDC bus can be controlled using a centralized closed-loop controller. The centralized closed-loop controller can, in some examples, dynamically generate a power reference $P_g^*$ to be drawn from the grid. In some examples, a proportional integral (PI) compensator $F_{PI}(s)$ can be used. And in some examples, a load power $P_{LV}$ feedforward can be used for a faster dynamic response in an event of a sudden load change.

For energy storage applications, when a battery is connected to the LVDC bus, the power reference $P_g^*$ can be set in an open-loop fashion. A phase-locked loop (PLL) can be used to extract the grid phase and voltage amplitude. The grid current can be controlled by a closed-loop controller following the power reference $P_g^*$. A multi-level/interleaved pulse-width modulator (PWM) can generate encoded gate pulses for the AFE bridges.

Figure 5:
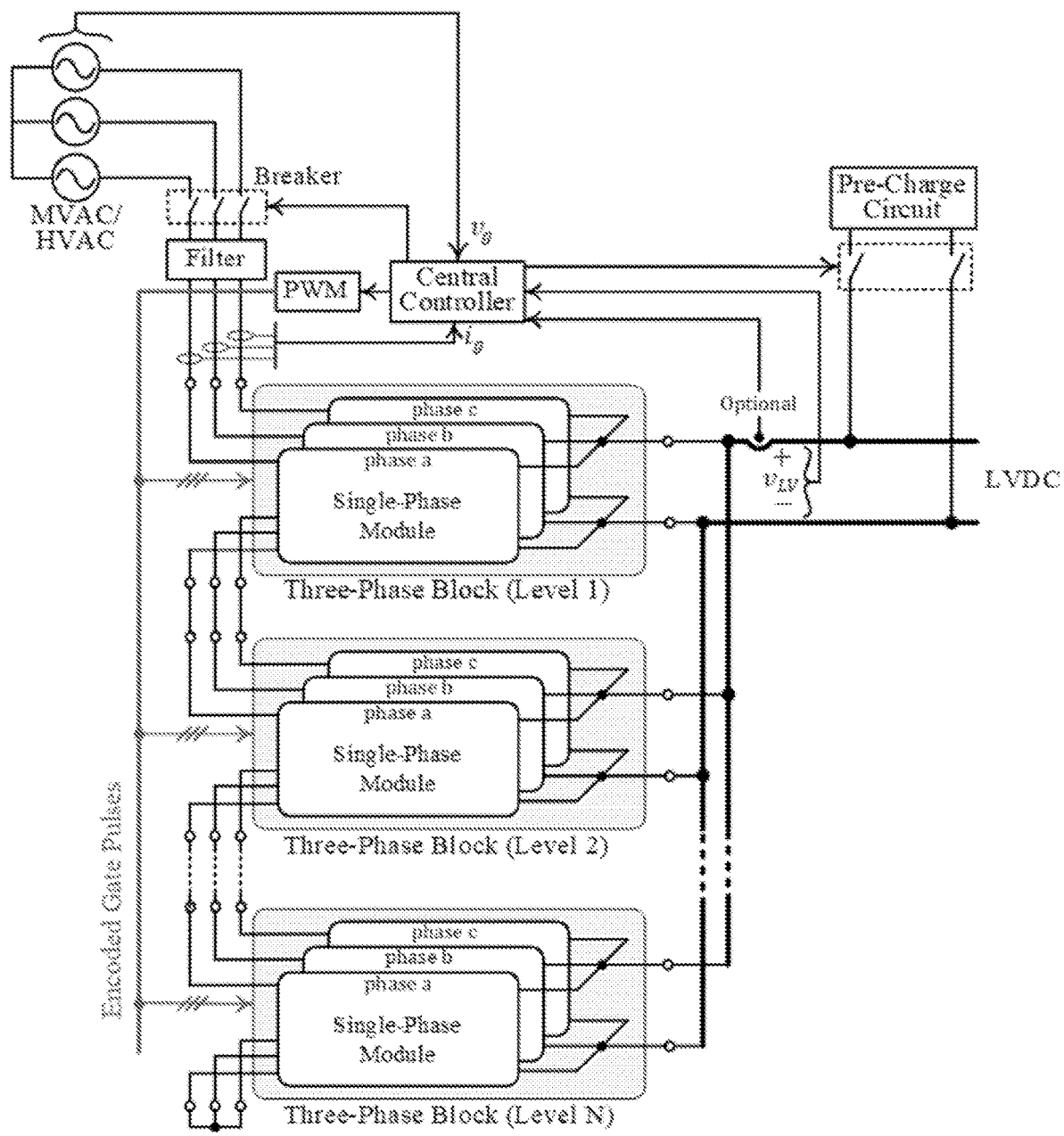
FIG. 5 shows an example of an implementation of a modular converter structure with a pre-charge circuit, according to various embodiments of the present disclosure.

FIG. 5 shows an example of an implementation of a modular converter structure with a pre-charge circuit. This example includes a three-phase SST configuration using ISOP connected SPMs. Each SPM can connect to a single-phase AC supply through the AFE and hence be subject to a double-line frequency power pulsation. If DC power is drawn through the DC terminal, the MVDC bus can use a large capacitor. This large capacitor can serve as an energy buffer to compensate for the instantaneous difference between the AC and DC power flows through the AFE and the DAB stages, respectively. To avoid large energy storage element on the MVDC bus, the DAB stage can be designed and operated to process AC power, like the AFE stage. Thus, double line-frequency voltage variation can be avoided using minimal capacitors on the MVDC bus.

The DC terminals of SPMs with their AC terminals connected to a three-phase supply can be tied together in a three-phase block. The AC power pulsations through the SPMs in the three-phase block can be combined at the DC terminal to obtain constant DC output. To reach a desired AC voltage level, N three-phase blocks can be connected in an ISOP configuration.

Common mode (CM) and differential mode (DM) filters can be used to meet relevant grid codes. A central controller can be responsible for maintaining the LVDC output by dynamically regulating the grid current. The central controller can also be responsible for soft start-up of the system using a grid-side breaker and a pre-charge circuit.

One of the key challenges for medium voltage applications is achieving a basic insulation level (BIL). In some examples, the LVDC bus can be referenced to the protective earth (PE) ground. In such a configuration, the MFTs in the DAB stages have to be designed to provide the BIL capability. For instance, to connect to a 13.2 kV feeder on the AC side, BIL capability of ≈90 kV can be used. The MFT and the auxiliary systems such as the gate-drivers for the power semiconductor devices and auxiliary power supply for the digital control boards may be properly designed and grounded to achieve the desired BIL capability.

In examples such as electric vehicle charging where no battery or DC source is connected at the LVDC bus, a pre-charge circuit can be used for start-up. In these examples, the central controller can manage the start-up process. Before start-up, the breaker can be open, and the system can be disconnected from the grid. The pre-charge circuit can be connected to the LVDC bus and the LVDC bus can be charged to a pre-defined voltage. The DAB stages switch the power devices on the LVDC side (Bridge II) and the MVDC side (Bridge I) and can be used as a diode-rectifier. The pulse-width of Bridge I can be slowly ramped up to charge the MVDC bus. The closed-loop regulation of the MVDC bus can then be initiated locally.

If an L filter is used on the grid side, the breaker can be closed after the MVDC buses are charged. If an LCL filter is used, the filter capacitors can be charged to match the grid voltage and, subsequently, the breaker can be closed. To match the voltages across the breaker, voltage sensors may be used to measure the voltage across the LCL filter capacitors, for example. As another example, an observer may be used to estimate the voltage without any physical sensors. After closing the breaker, the central controller can disconnect the pre-charge circuit from the LVDC bus and the closed-loop regulation of the LVDC bus voltage can be initiated by controlling the grid current and the converter can enter nominal operation.

Control Structure

In existing control approaches, the grid current is dynamically regulated to maintain the internal MVDC buses, whereas the power flow through the DC-DC stages are controlled to regulate the LVDC bus output. Consequently, module level voltage and power balancing involving a central controller with high speed bidirectional communication to the modules is desired.

Disclosed herein is an alternative control structure where the grid current can be dynamically controlled through the AFE stages to regulate the LVDC bus voltage. The DAB stages can be operated as DC transformers to maintain the MVDC bus voltages keeping constant scaling with respect to the LVDC bus. For the control design, a well-defined time-scale separation between the MVDC bus and LVDC bus voltage regulation loops can be used. The former achieves at least an order of magnitude faster control response relative to that of the latter.

The DAB stage in each SPM can use a fully decentralized controller based on local sensor feedback to maintain its internal MVDC bus with a control bandwidth of at least an order of magnitude faster than that of the LVDC bus regulation. Hence, for the control design of the DAB converter, the LVDC bus voltage $v_{LV}$ is assumed constant in the frequency range of interest and the reference $v_{MV}^*$ for the LVDC bus voltage $V_{LV}$ feedback can be dynamically generated as:

$$v_{MV}^*(s) = K_v H_{ref}(s) v_{LV}(s); H_{ref}(s) = \frac{\omega_{c,ref}}{s + \omega_{c,ref}} \quad (2)$$

where $\omega_{c,ref}$ denotes the bandwidth for the reference generation, and $K_v$ denotes the constant voltage scaling factor and is set as $K_v = v_{MV}^0/v_{LV}^0$, with $v_{MV}^0$ and $v_{LV}^0$ denoted the desired nominal voltages at the MVDC and LVDC buses, respectively.

Bi-directional phase shift modulation (BPSM) can be used and a closed-loop voltage compensator generates the phase shift φ for the BPSM. For an NPC full-bridge on the MVDC side, capacitor voltage balancing (CVB) can be used. In some examples, double phase-shift modulation (DPS) can used. But for simplicity of analysis, a ≈50% duty ratio is assumed. Thus, the power transfer between the two bridges for a phase shift φ can be given as:

$$P_d = \frac{n v_{LV} v_{MV}}{2\pi f_s L} \{\phi(1-\phi)\} \quad (3)$$

where n and L denote the turns-ratio and the leakage inductance of the MFT including any external inductor, respectively; $f_s$ denotes the switching frequency; and φ>0 corresponds to MVDC-side bridge output voltage leading that of the LVDC-side bridge. Note that the leakage inductance L can be referred to the MVDC side of the MFT.

The frequency of the LC series resonance contributed by the leakage inductance and the blocking capacitors can be given by $$f_r = \frac{1}{2\pi}\sqrt{\frac{n^2 C_{b1} + C_{b2}}{L C_{b1} C_{b2}}} \quad (4)$$

The blocking capacitors can be chosen to set the LC resonance frequency as $(f_{s1}/10) < f_r \ll f_{s1}$, which enables ignoring the LC resonant dynamics in the frequency range of interest such as $f_s/10$ for the voltage compensator design.

The voltage dynamics of the MVDC bus are derived as $$\frac{d}{dt}\left(\frac{1}{2} C_{MV} v_{MV}^2\right) = P_a - P_d \quad (5)$$

where $P_a$ demotes the power flow through the AFE bridge (see FIG. 1A).

Linearizing Equation (2) and Equation (4), the small signal response of the MVDC bus voltage can be derived as $$\frac{\Delta v_{MV}}{\Delta \phi} = -\frac{n V_{LV}}{2\pi f_s L C_{MV} S} \quad (6)$$

where $V_{LV}$ denotes the operating value of $V_{LV}$.

Figure 6:
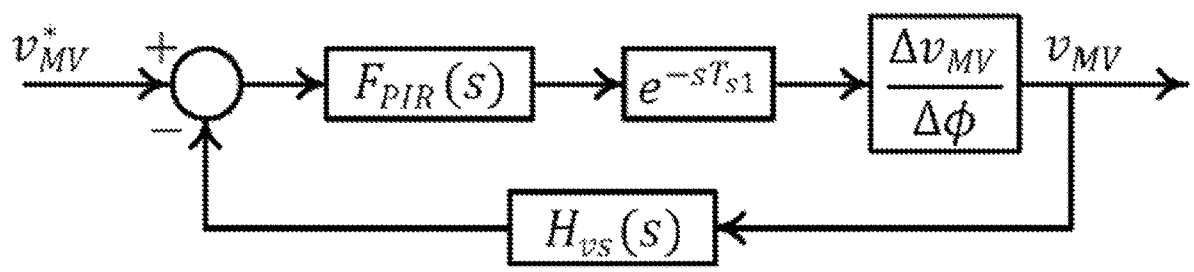
FIG. 6 shows an example of a control system block diagram for a dual active bridge stage and medium-voltage DC bus voltage regulation, according to various embodiments of the present disclosure.

FIG. 6 shows an example of a control system block diagram for the DAB stage and MVDC bus voltage regulation. In the example of FIG. 6, one-sample delay of $T_s$ is considered corresponding to controller implementation. The voltage sensor can be modelled as:

$$H_{vs}(s) = \frac{\omega_{vs}}{s + \omega_{vs}} \times e^{-s T_{vs}} \quad (7)$$

where $\omega_{vs}$ and $T_{vs}$ denote the bandwidth and transmission time of the voltage sensor.

The digital control board for each DAB stage can be referenced to the PE ground. Consequently, the BIL of ≈90 kV can be met while sensing the MVDC bus voltage. Therefore, delta-sigma voltage sensors can be used and the sensor output can be transferred over optical fibers as bit-streams to the digital control board. These optically isolated sensors can incur substantial transmission delays on the order of 40 μs-100 μs, and so the sensor and signal conditioning may be modelled properly for the controller design.

The compensator can be designed as:

$$F_{PIR}(s) = K_{pmv}\left[1 + \frac{1}{sT_{imv}} + \frac{\left(\frac{1}{T_{rmv}}\right)\omega_{bmv}s}{s^2 + \omega_{bmv}s + (2\omega_0)^2}\right] \quad (8)$$

where $K_{pmv}$ denotes the proportional gain, $T_{imv}$ is the integral time-constant and $T_{rmv}$ is the time-constant for the resonant compensation at the double line-frequency $2\omega_0$ with a bandwidth of $\omega_{bmv}$.

Indeed, the closed-loop controller can use a proportional integral resonant compensator $F_{PIR}(s)$. The resonant compensation can be used to eliminate a second harmonic oscillation in the MVDC bus voltage.

$$F_{PIR}(s) = K_{pmv}\left(1 + \frac{1}{\tau_{mv}s} + \frac{1}{\tau_{rmv}} \times \frac{\omega_{rb}}{s^2 + \omega_{rb}s + \omega_2^2}\right) \quad (9)$$

where $K_{pmv}$ is the proportional gain; $\tau_{mv}$ and $\tau_{rmv}$ are the time constants for the integral and resonant compensation, respectively; and $\omega_{rb}$ is the bandwidth of the resonant compensation at the second harmonic frequency $\omega_2$.

The overall compensated open-loop response can be derived as:

$$G_{mvdc}(s) = -\frac{nV_{LV}}{2\pi f_s LC_{MV}s} F_{PIR}(s)H_{vs}(s)e^{-sT_{s1}} \quad (10)$$

To illustrate the compensator design, the converter system is considered with parameters listed in Table II, whereas the SPM parameters are listed in Table I.

TABLE I

SINGLE-PHASE MODULE (SPM) PARAMETERS

| | | | |
|---|---|---|---|
| $V_{MVO}$ | Nominal MVDC bus voltage | 2.15 | kV |
| $V_{spm}^{nc}$ | Nominal MVAC voltage | 1.27 | kV |
| $V_{spm}^{dc}$ | Nominal LVDC voltage | 750 | V |
| $P_{spm}$ | Rated real power | 55.6 | kW |
| $Q_{spm}$ | Rated reactive power | 25 | kVAR |
| $f_{s1}$ | DAB switching/sampling frequency | 20 | kHz |
| $f_{s2}$ | AFE bridge switching frequency | 5 | kHz |
| $C_{MV}$ | MVDC bus capacitor | 268 | μF |
| L | Leakage inductor of DAB MFT | 137 | μH |
| n | MFT turns-ratio | 3 | |
| $C_{b1}$ | DC blocking capacitor (MVDC side) | 6.8 | μF |
| $C_{b2}$ | DC blocking capacitor (LVDC side) | 150 | μF |

TABLE II

SYSTEM LEVEL PARAMETERS

| | | | |
|---|---|---|---|
| $S_{rated}$ | Rated power | 1.1 | MVA |
| $P_{rated}$ | Rated seal power | 1 | MW |
| $Q_{rated}$ | Rated reactive power | 450 | kVAR |
| $V_{g0}$ | Nominal (L-L RMS) grid voltage | 13.2 | kV |
| $\omega_0$ | Nominal frequency | 2π(60) | rad/s |
| $V_{LV}^*$ | Nominal LVDC bus voltage | 750 | V |
| N | Number of three-phase blocks | 6 | |
| $f_c$ | Control frequency for LVDC bus regulation | 10 | kHz |

Figure 7:
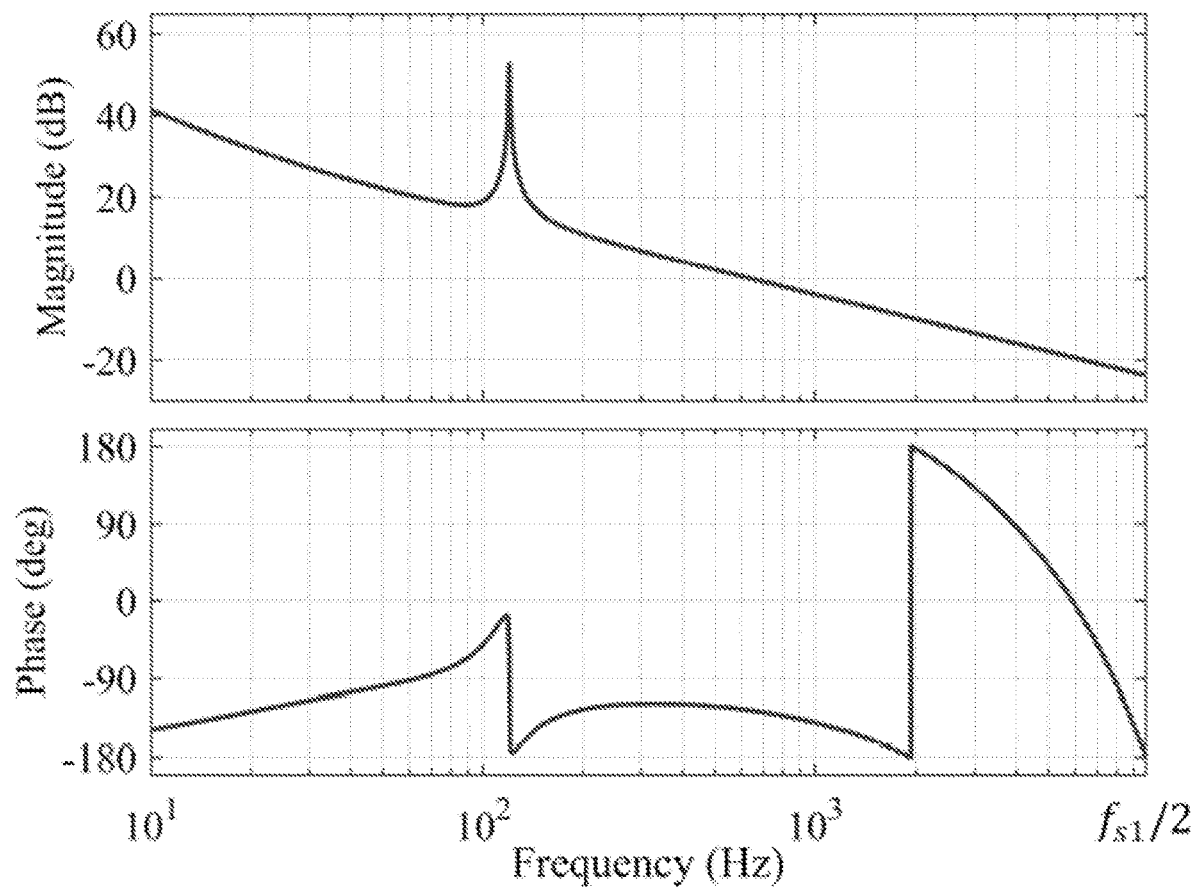
FIG. 7 shows an example of a compensated open-loop response of medium-voltage DC bus voltage regulation, according to various embodiments of the present disclosure.

FIG. 7 shows an example of the compensated open-loop response of the MVDC bus voltage regulation. The delta-sigma voltage sensor can have a transmission time of $T_{vs}\approx77$ μs and a bandwidth of $\omega_{vs}\approx 2\pi(100)$ krads/s. The compensator gains can be selected as $K_{pmv}$=0.0082 rad/V, $T_{imv}$ 0.01 s, $T_{rmv}$=0.01 s, and $\omega_{bmv}$=πrad. Thus, a control bandwidth of $f_{vmvdc}\approx 643$ Hz can be obtained with a phase margin of 55° and gain margin of 10 dB. The bandwidth of the reference generation filter, given by Equation (1), can be set as $\omega_{ref}/(2\pi)$=130 Hz$\approx$$f_{cmvdc}/5$.

LVDC Bus Voltage Regulation

In the frequency range of interest, such as tens of Hz, for LVDC bus voltage regulation, the DAB stages effectively behave as DC transformers and can provide isolated DC buses for the cascaded H-bridges in the AFE stage. Multi-level modulation or interleaved PWM modulation can be used for the AFE stages. For a device switching frequency of 5 kHz, multilevel modulation of the N=6 AFE bridges in each phase can enable to meet relevant grid codes using an L-filter as the DM filter. For the analysis and control design, the CM filter can be ignored.

Figure 8:
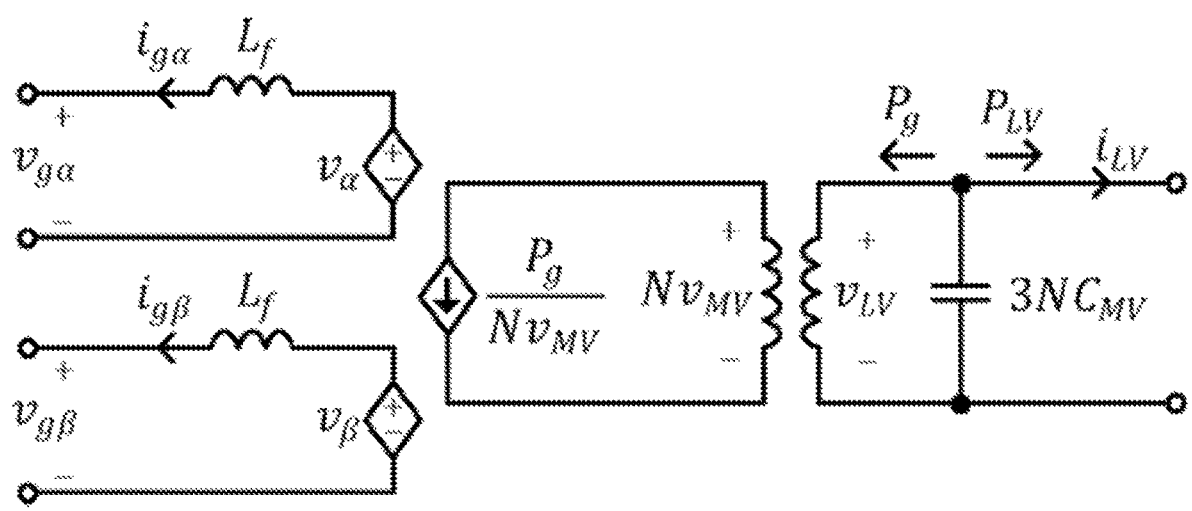
FIG. 8 shows an example of an equivalent circuit for analysis and design of a low-voltage DC bus voltage regulator, according to various embodiments of the present disclosure.

FIG. 8 shows an example of an equivalent circuit for analysis and design of LVDC bus regulation. The system is shown in stationary αβ frame, and the real power injected into the grid can be given as $$p_g = \frac{3}{2}(v_\alpha i_\alpha + v_\beta i_\beta).$$

The ISOP configuration and the multi-level/interleaved modulation can facilitate an equivalent MVDC bus voltage of $Nv_{MV}$. Thus, the converter can be effectively treated as a three-phase active rectifier followed by an ideal DC transformer supplying DC power to the LVDC bus.

The LVDC bus voltage dynamics can be given as:

$$\Delta v_{LV}(s) = \frac{1}{3NC_{MV}V_{MV}} \times [-\Delta P_g(s) - \Delta P_{LV}(s)] \quad (11)$$

where $P_{LV}=i_{LV}v_{LV}$ denotes the power drawn from the LVDC bus. A proportional integral (PI) compensator $F_{PI}(s)$ can be used to generate the reference $P_g^*$. Feedforward of $P_{LV}$ can be added using sensor measurement of $i_{LV}$.

Figure 9:
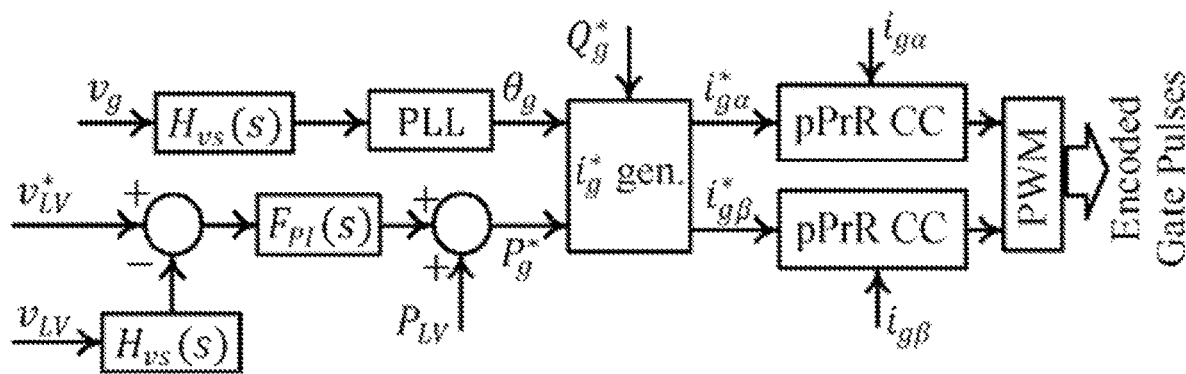
FIG. 9 shows an example of a control system for low-voltage DC bus voltage regulation, according to various embodiments of the present disclosure.

FIG. 9 shows an example of a control system of LVDC bus voltage regulation. A phase-locked loop (PLL) running on the grid voltage $v_g$ detects the grid phase $\theta_g$ and the grid-current reference $i_\alpha^*$ and $i_\beta^*$ are generated using $\theta_g$, $P_g^*$, and reactive power reference $Q_g^*$. Passivity-based predictive resonance (pPrR) current controller (CC) is used in the stationary reference frame.

The AFE bridges can be used as two-level full H-bridges. The NPC configuration can be used to reach 2.15 kV DC bus utilizing lower voltage rated power devices. The PWM state for each AFE bridge corresponding to $\{-v_{MV}, 0, v_{MV}\}$ is encoded into 2-bit digital data and transferred to the respective SPM over optical fibers. The local controller at the SPM decodes the gating information and generates the full gating signals for the power devices. The LVDC bus voltage regulator and the pPrR CC at the central controller are updated at a sampling rate of $f_c$=10 kHz. The pPrR CC is designed for a control bandwidth of $\approx$400 Hz.

The LVDC bus voltage regulation is performed by a central controller which only uses the sensor feedback of $v_{LV}$, $i_{LV}$. Unlike existing methods, the central controller does not require the measurement of all MVDC buses. As the number of SPMs increases to reach higher grid voltage and power capacity, the controller structure may not need to change; fiber optic cables can be added to carry the encoded gate pulses to the oncoming SPMs.

Soft Start-Up

The ISOP configuration of the converter comprising 3N SPMs can pose a challenge for system start-up. The MVDC buses in each SPM may be charged before the closing of the grid-side breaker (see FIG. 5) to prevent large current inrush, while the AFE bridges can behave as uncontrolled rectifier constituted by the anti-parallel diodes of the power devices. A similar inrush problem can arise if the DAB stages are started without charging the MVDC buses.

In some examples, medium voltage drives with an active-front end can comprise a dedicated start-up/pre-charge circuit, which can charge the internal MVDC bus before initiating the device switching and connecting to the MV grid. In some examples, a pre-charge circuit is can be rated at a fractional power capacity compared to the actual converter and provides medium voltage excitation from a low-voltage house-keeping supply of 208 VAC or 408 VAC. Such a pre-charge circuit can also be used for component- and system-level diagnostics and testing when subject to medium voltage excitation during a system assembly phase when a medium voltage feeder is not available.

Figure 10:
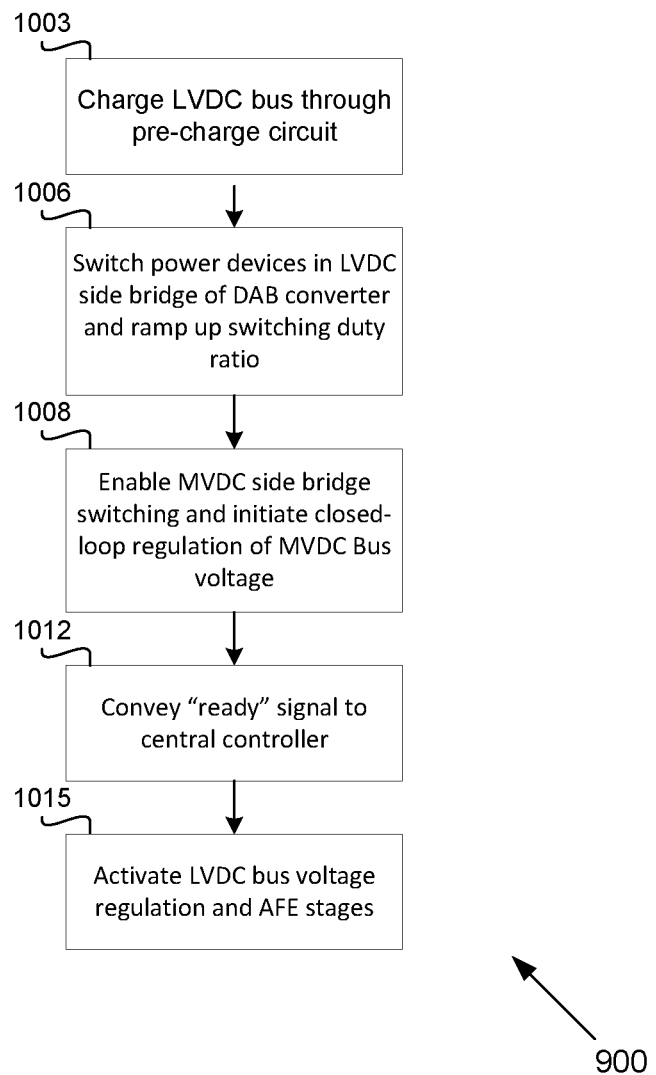
FIG. 10 shows an example of a flowchart that illustrates at least a portion of a system start-up sequence, according to various embodiments of the present disclosure.

FIG. 10 shows an example of a flowchart that illustrates at least a portion of a system start-up sequence 900. In some examples, for the disclosed converter and control structure, a pre-charge circuit (see FIG. 5) can be used that connects to a low voltage AC supply of 480 VAC and can be used to charge the LVDC bus instead of the MVDC buses.

At step 1003, the LVDC bus can be charged through the pre-charge circuit. At this condition, the grid-side breaker can be open. The controller and the power device switching can be disabled.

At step 1006, the power devices in the LVDC side bridge of the DAB converter in each SPM can be switched, and the switching duty ratio can be ramped up gradually. The MVDC side bridge and the AFE bridge can be disabled. The MVDC side bridge of the DAB can act as an uncontrolled rectifier and the MVDC bus can be charged without high inrush current.

At step 1009, once the MVDC buses are charged, the MVDC side bridge switching can be enabled, and the closed-loop regulation of the MVDC bus voltage can be initiated. The AFE stages can be kept disabled.

At step 1012, a low-bandwidth communication channel can convey a "ready" signal to the central controller. The pre-charge circuit can be disconnected, and the grid-side breaker can be closed. This low-bandwidth communication channel can be designed for system monitoring. In some examples, a slow or very low-bandwidth communication system can be used for the system monitoring and diagnostics, which can also be used for coordinating the start-up sequence.

At step 1015, the LVDC bus voltage regulation and the AFE stages can be activated. The system can then enter nominal operation. Thereafter, this portion of the operation of the system start-up sequence 900 can end.

Simulation and Experimental Results

Simulations can be performed for the system listed in Table I and Table II in PLECS simulation platform. A detailed switching model simulation can be used. Voltage and current sensor dynamics can be modelled based on the respective hardware sensors. To emulate component tolerances commensurate to the physical system and to illustrate the inherent voltage and power balancing capability of the disclosed control architecture, the leakage inductances of the MFTs in the DAB transformers can be varied as L={0.91, 0.92, . . . , 1.0, . . . , 1.08}×$L_0$ for the 18 SPMs, where $L_0$=137 µH. Similarly, the MVDC bus capacitors can be varied as $C_{MV}$={0.91, 0.92, . . . , 1.0, . . . , 1.08}×$C_{MV0}$ among the SPMs, where $C_{MV0}$=268 µF. For both L and $C_{MV}$, component values can vary between 1% to 17% among different SPMs.

Figure 11:
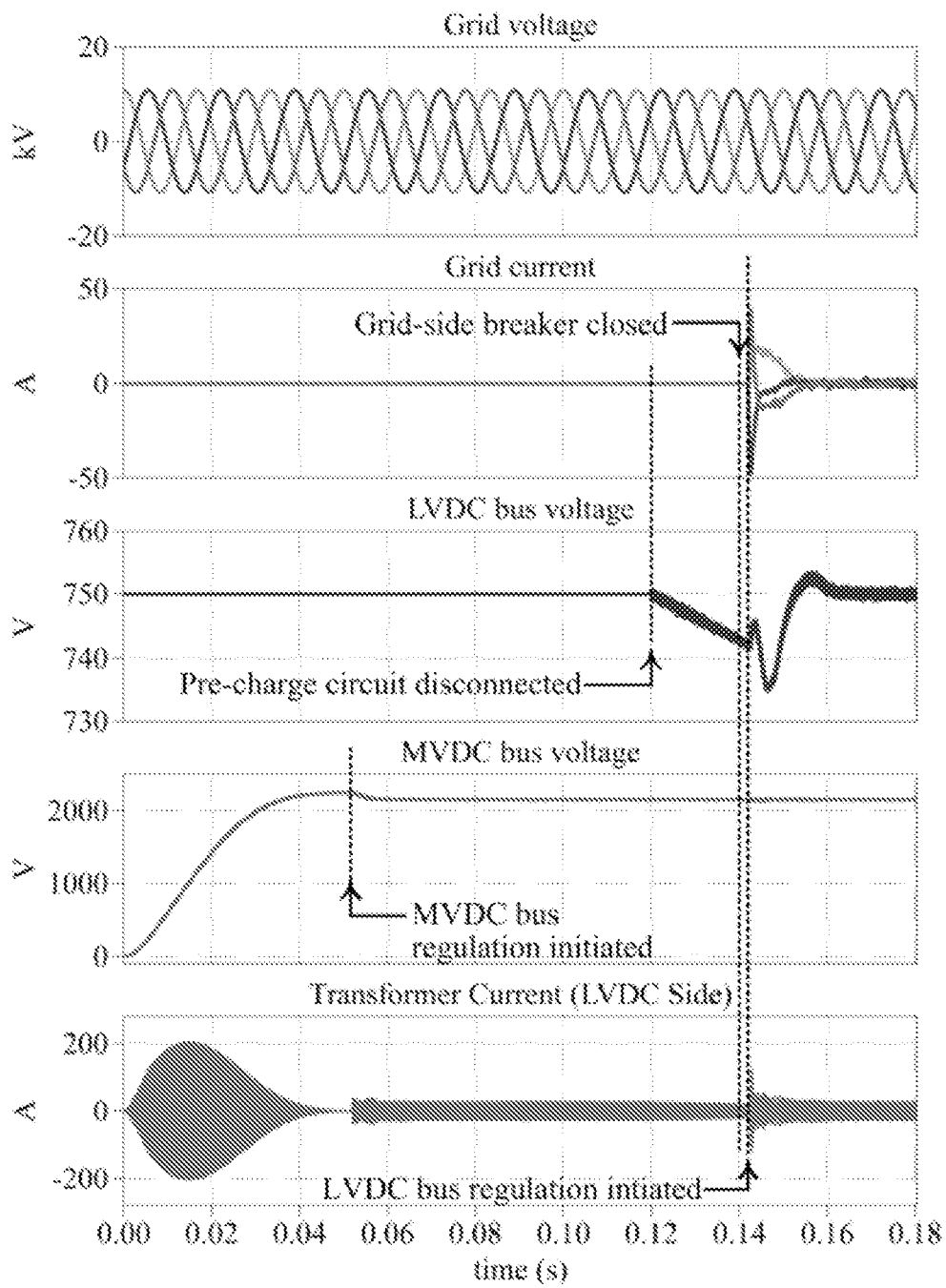
FIG. 11 shows an example of a soft start-up of a system, according to various embodiments of the present disclosure, according to various embodiments of the present disclosure.

FIG. 11 shows an example of a soft start-up of the system. MVDC bus voltages and LVDC-side transformer currents of a three-phase block are shown along with the grid voltage, grid current, and the LVDC bus voltage. Before initiating the MVDC bus voltage regulation, the MVDC bus can be slowly charged. Once the MVDC bus voltage regulation stabilizes, the pre-charge circuit can be disconnected. During this time, the electrical and magnetic losses of the DAB stages can be supplied from the LVDC bus capacitors. To emulate such effects, a resistive load of 700 W (≡1.2% p.u. loss) can be connected across the MVDC bus. The chosen load can emulate a very conservative loss since the efficiency of the DAB stage may be to be >99%. The LVDC bus can drop gradually. Next, the grid-side breaker can be closed without any transient since the MVDC buses may be charged. Subsequently, the LVDC bus voltage regulation along with the switching of the AFE bridges can be initiated and the LVDC bus voltage can be quickly stabilized at the desired value.

Figure 12:
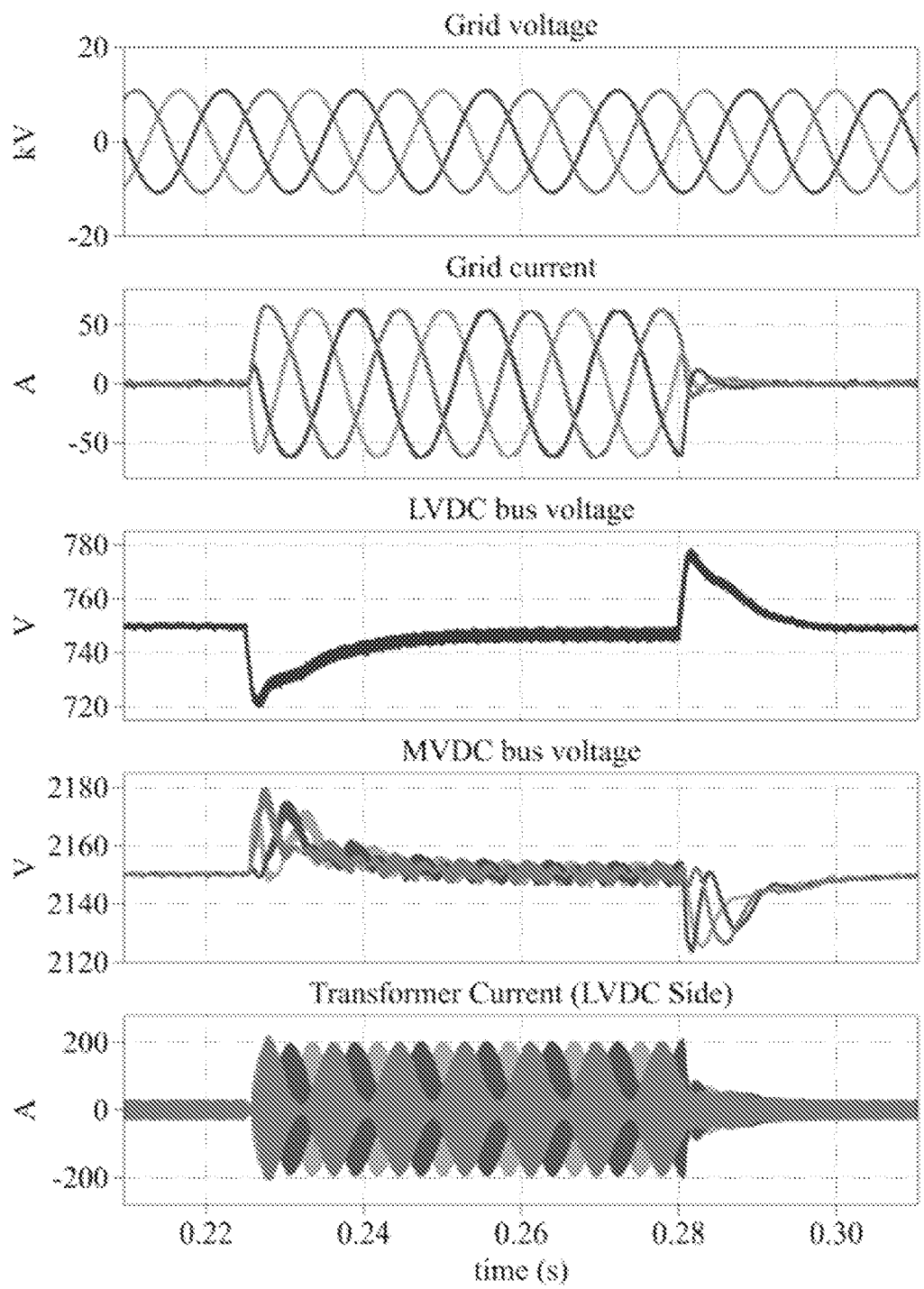
FIG. 12 shows an example of a system response to a no-load to full-load and full-load to no-load step change at a low-voltage DC bus, according to various embodiments of the present disclosure.

FIG. 12 shows an example of the system response when no-load to full-load and full-load to no-load step changes are introduced at the LVDC bus. In both cases the LVDC bus voltage can be quickly stabilized at the reference value with minimal transients.

Figure 13:
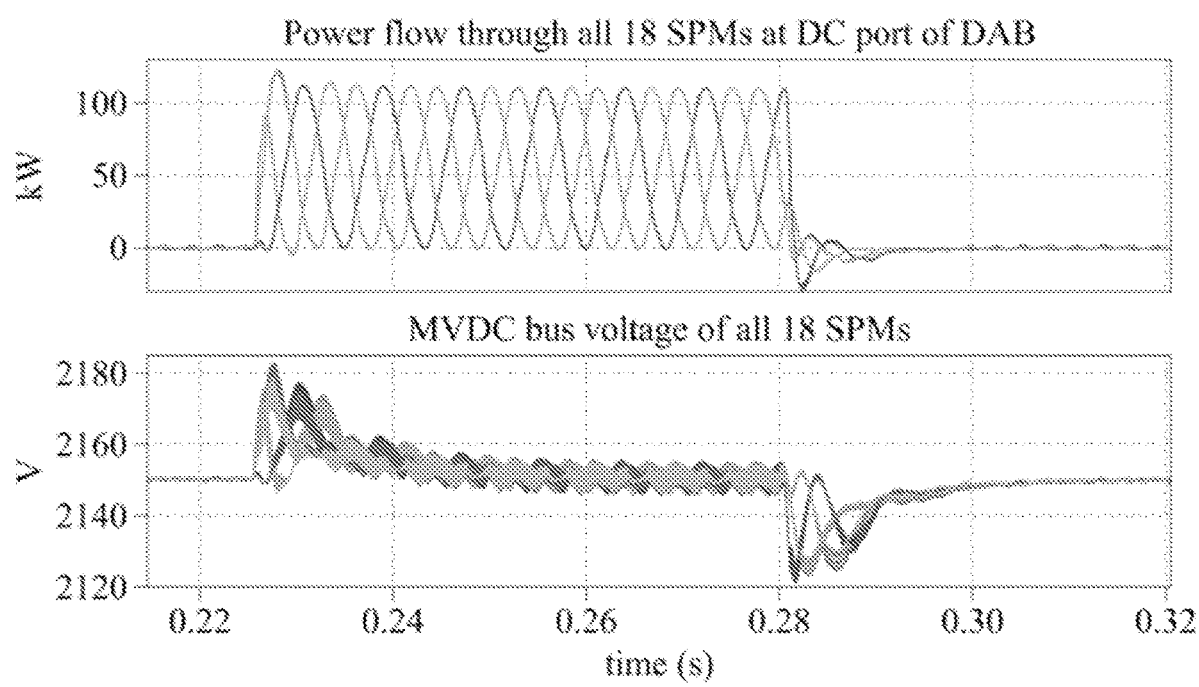
FIG. 13 shows an example of inherent voltage and power balancing among single-phase modules, according to various embodiments of the present disclosure.

FIG. 13 shows an example of the inherent voltage and power balancing among SPMs. The MVDC bus voltages and power flow through the SPMs are inherently balanced by the controller. Despite the variation as high as 17% in the leakage inductance of the MFTs and the MVDC bus capacitor values among different SPMs, the MVDC bus voltage balance and power flow balance can be retained even during transients. During transients, the MVDC bus voltage and power flow can vary among different phases. This is expected, but balanced operation can be retained among all SPMs corresponding to each phase.

Figure 14:
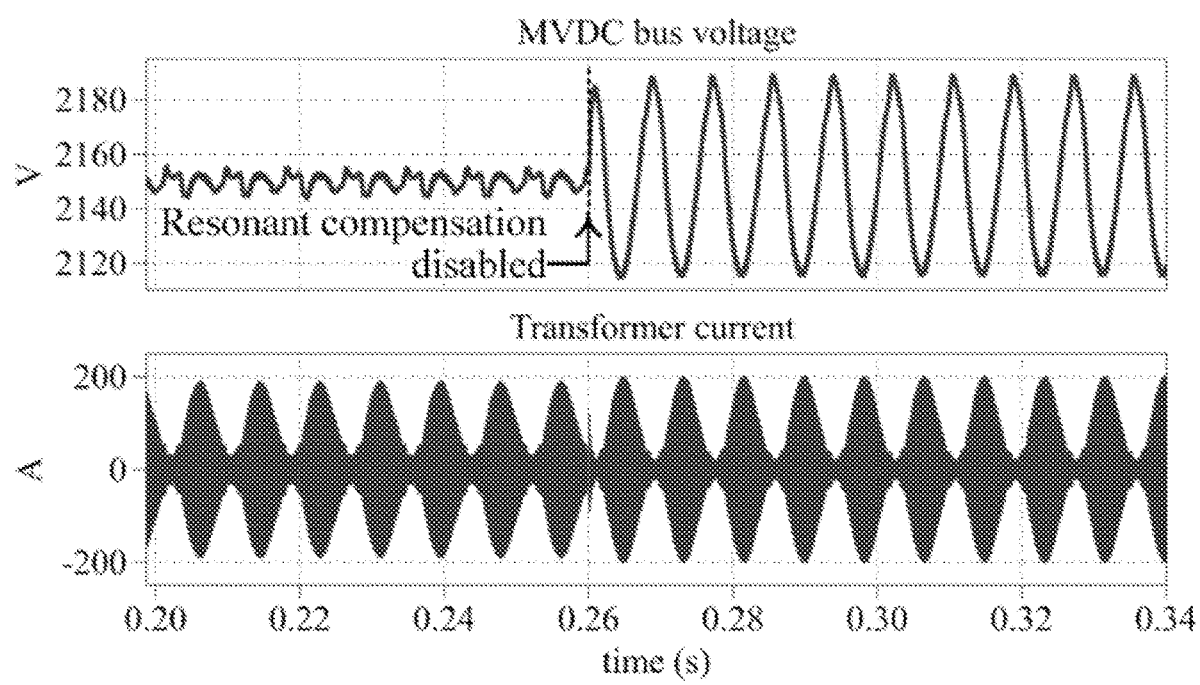
FIG. 14 shows an example of an effectiveness a resonant compensator medium-voltage DC bus voltage regulation, according to various embodiments of the present disclosure.

FIG. 14 shows an example of the effectiveness of the resonant compensator for the MVDC bus voltage regulation. Disabling the resonant compensation leads to very high ripple in MVDC bus voltage at double-line frequency. The resonant compensator can effectively eliminate the double line frequency voltage ripple on the MVDC bus. Disabling the resonant compensation can lead to a ≈90 V ripple.

Figure 15A:
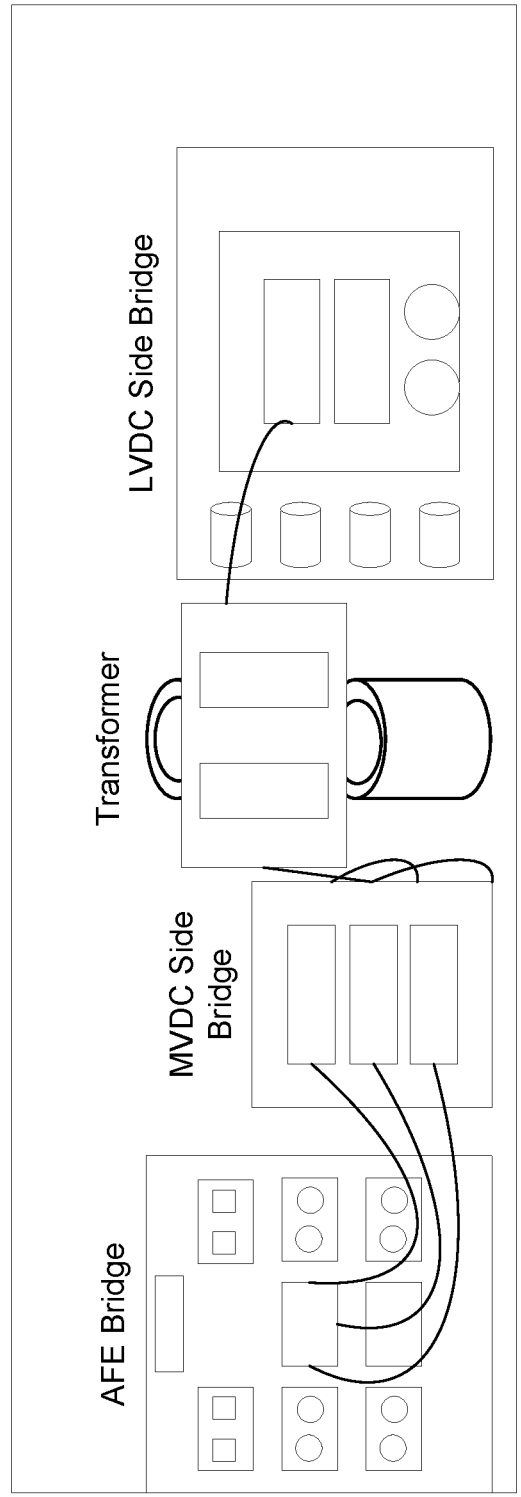
FIG. 15A shows an example of a hardware prototype assembly and a single-phase module, according to various embodiments of the present disclosure.
Figure 15B:
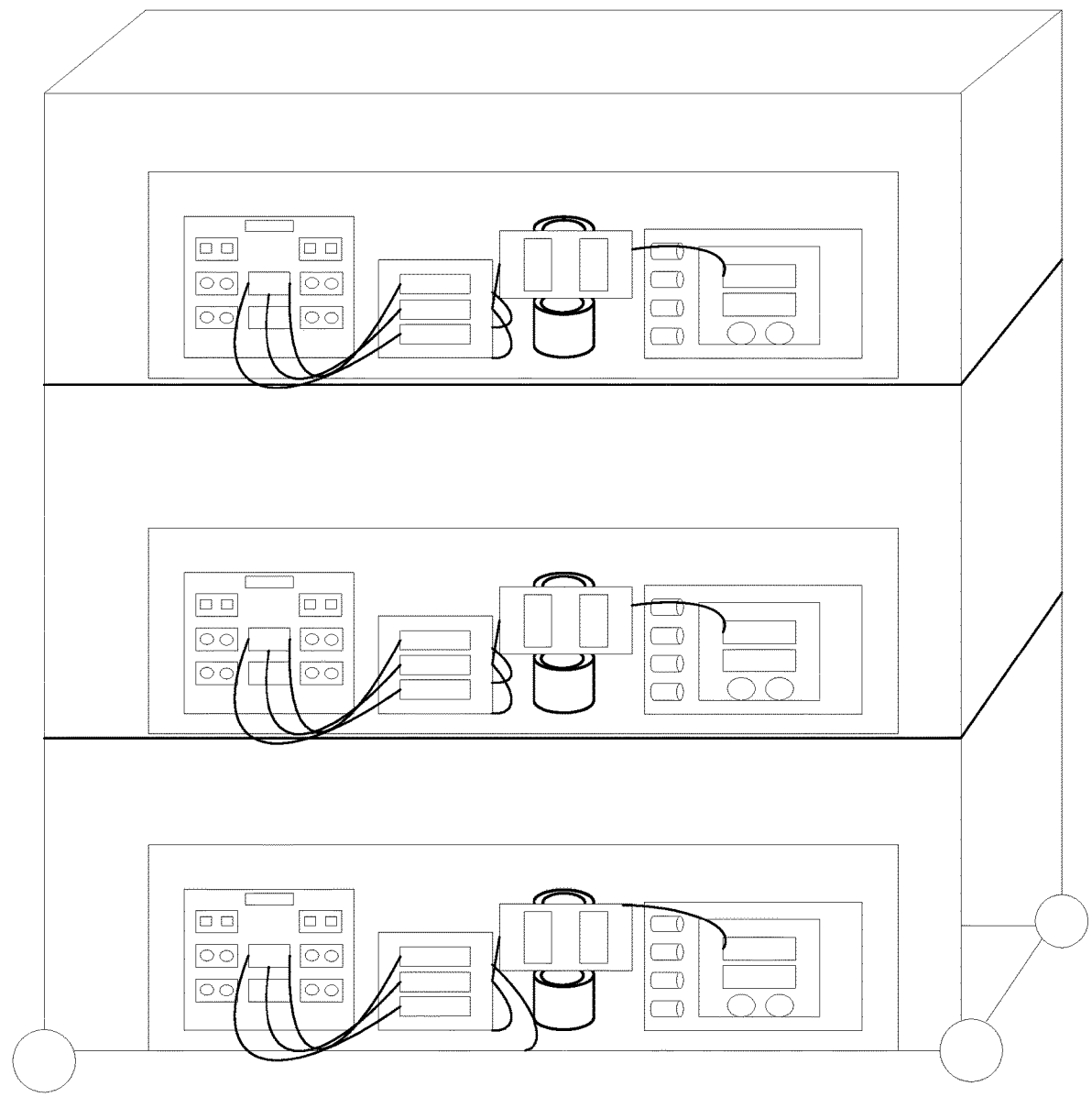
FIG. 15B shows an example of a three-phase block comprising three single-phase modules mounted on a rack, according to various embodiments of the present disclosure.

FIG. 15A shows a hardware prototype assembly of an SPM. This prototype includes an AFE bridge, a MVDC-side bridge, a transformer, and an LVDC side bridge. FIG. 14B shows an example of a rack-mounted three-phase block comprising three SPMs as shown in FIG. 15A.

Figure 16:
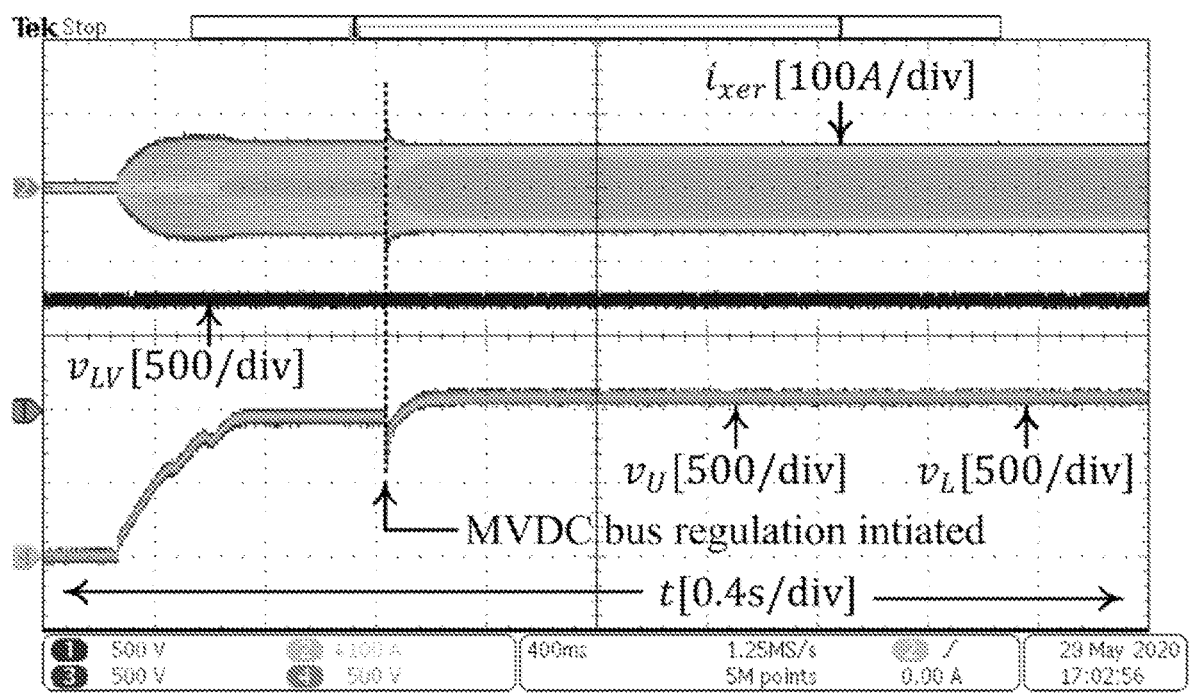
FIG. 16 shows an example of a soft start-up sequence of a dual active bridge stage, according to various embodiments of the present disclosure.

FIG. 16 shows an example of the soft start-up sequence of the DAB stage. The upper and lower capacitor voltages of the MVDC-side NPC bridge, the LVDC bus voltage, and the transformer current $i_{xer}$ on the MVDC side are shown. To validate the start-up process and the continuous operation of the DAB, a DC supply can be connected to the LVDC bus and a 93 kW (≈1.6 p.u.) DC load can be connected across the MVDC bus. The MVDC bus voltage can be quickly stabilized once the voltage regulator is initiated.

The disclosed converter and control structure can achieve module level voltage and power flow balancing utilizing complete decentralized control of the isolated DC-DC stages. Leveraging proper time-scale separation among different control loops, the DC-DC stages can be operated as ideal DC transformers that facilitate isolated DC buses for the AFE stages. LVDC bus voltage regulation can be achieved by a central controller using minimal communication. The inherent balancing capability is demonstrated through detailed switching model simulation. The soft start-up is validated through experiments using a full-scale module.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A modular converter, comprising:
a low-voltage direct current bus;
a centralized controller configured to regulate the low-voltage direct current bus;
a plurality of three-phase blocks connected in series, individual three-phase blocks of the plurality of three-phase blocks comprising a plurality of single-phase modules connected in an input-series output-parallel configuration, wherein individual single-phase modules of the plurality of single-phase modules each comprise a bidirectional active front end bridge and a bidirectional dual active bridge;
a pre-charge circuit configured to couple to an output of the bidirectional dual active bridges of the plurality of single-phase modules, wherein the centralized controller controls coupling of the pre-charge circuit is to the bidirectional dual active bridges;
a filter connected between a grid input and the plurality of three-phase blocks; and
a pulse-width modulator configured to generate encoded gate pulses for the individual three-phase blocks of the plurality of three-phase blocks.

2. The modular converter of claim 1, further comprising:
a breaker connected to the grid input, wherein the centralized controller is further configured to control an operation of the breaker, and wherein the pre-charge circuit is configured to connect to the low-voltage direct current bus.

3. The modular converter of claim 1, wherein individual single-phase modules of the plurality of single-phase modules further comprise:
the dual active bridge converter comprising a primary bridge and a secondary bridge;
a decoder configured to receive the encoded gate pulses from the centralized controller and control an operation of the bidirectional active front-end bridge based at least in part on the encoded gate pulses; and
a medium-voltage direct current bus shared by the bidirectional active front-end bridge and the dual active bridge converter.

4. The modular converter of claim 3, wherein the dual active bridge converter regulates the medium-voltage direct current bus based on sensor feedback and measurements locally available within an individual single-phase module.

5. The modular converter of claim 3, wherein the individual single-phase modules of the plurality of single-phase modules further comprise at least one direct current blocking capacitor.

6. The modular converter of claim 1, wherein the grid input comprises a medium-voltage alternating current input or a high-voltage alternating current input.

7. A system, comprising: a plurality of three-phase blocks connected in series, individual three-phase blocks of the plurality of three-phase blocks comprising a plurality of single-phase modules connected in an input-series output-parallel configuration, and individual single-phase modules of the plurality of single-phase modules comprising: a bidirectional active front-end bridge; a bidirectional dual active bridge converter comprising a primary bridge and a secondary bridge; a controller configured to output bidirectional modulation signals; a decoder configured to receive the encoded gate pulses from at least the bidirectional phase shift modulation signals and control an operation of the active front-end bridge based at least in part on the encoded gate pulses; and a medium-voltage direct current bus shared by the active front-end bridge and the dual active bridge converter; a filter connected between a grid input and the plurality of three-phase blocks; and a pulse-width modulator configured to generate the encoded gate pulses for the individual three-phase blocks of the plurality of three-phase blocks.

8. The system of claim 7, further comprising:
a low-voltage direct current bus;
a pre-charge circuit connected to the low-voltage direct current bus;
a breaker connected to the grid input; and
a centralized controller configured to regulate the low-voltage direct current bus and to control an operation of the breaker.

9. The system of claim 7, wherein the individual single-phase modules of the plurality of single-phase modules further comprise at least one direct current blocking capacitor.

10. The system of claim 7, wherein the dual active bridge converter regulates the medium-voltage direct current bus based on sensor feedback and measurements locally available within an individual single-phase module.

11. An apparatus, comprising:
a low-voltage direct current bus;
a centralized controller configured to regulate the low-voltage direct current bus;

a plurality of three-phase blocks connected in series, wherein individual three-phase blocks of the plurality of three-phase blocks each comprise a plurality of single-phase modules, and wherein individual single-phase modules of the plurality of single-phase modules each comprise a bidirectional active front end bridge and a bidirectional dual active bridge;

a pre-charge circuit configured to couple to an output of the bidirectional dual active bridges of the plurality of single-phase modules, wherein the centralized controller controls coupling of the pre-charge circuit is to the bidirectional dual active bridges;

a decoder configured to receive encoded gate pulses from at least a bidirectional phase shift modulation;

a filter connected between a grid input and the plurality of three-phase blocks; and a pulse-width modulator configured to generate the encoded gate pulses for the individual three-phase blocks of the plurality of three-phase blocks.

12. The apparatus of claim 11, further comprising:

a breaker connected to the grid input, wherein the centralized controller is further configured to control an operation of the breaker, and wherein the pre-charge circuit is configured to connect to the low-voltage direct current bus.

13. The apparatus of claim 11, wherein the individual plurality of single-phase modules is connected in an input-series output-parallel configuration.

14. The apparatus of claim 13, wherein individual single-phase modules of the plurality of single-phase modules comprise:

the bidirectional dual active bridge converter comprising a primary bridge and a secondary bridge;

the decoder configured to receive the encoded gate pulses from the centralized controller and control an operation of the bidirectional active front-end bridge based at least in part on the encoded gate pulses; and a medium-voltage direct current bus shared by the bidirectional active front-end bridge and the dual active bridge converter.

15. The apparatus of claim 14, wherein the dual active bridge converter regulates the medium-voltage direct current bus based on sensor feedback and measurements locally available within an individual single-phase module.

16. The apparatus of claim 14, wherein the individual single-phase modules of the plurality of single-phase modules further comprise at least one direct current blocking capacitor.

17. The apparatus of claim 13, wherein the grid input comprises a medium-voltage alternating current input or a high-voltage alternating current input.

* * * * *